United States Patent
Bohn et al.

(10) Patent No.: US 10,863,004 B2
(45) Date of Patent: Dec. 8, 2020

(54) MULTIPLE SOURCE RECEIVER

(71) Applicant: NXP B.V.

(72) Inventors: Sebastian Bohn, Dresden (DE); Matthias Schattka, Dresden (DE)

(73) Assignee: NXP B.V., Eindhoven (NL)

( * ) Notice: Subject to any disclaimer, the term of this patent is extended or adjusted under 35 U.S.C. 154(b) by 217 days.

(21) Appl. No.: 15/612,788

(22) Filed: Jun. 2, 2017

(65) Prior Publication Data
US 2018/0007174 A1    Jan. 4, 2018

(30) Foreign Application Priority Data
Jul. 1, 2016   (EP) .................................... 16177551

(51) Int. Cl.
*H04L 29/06*   (2006.01)
*H04H 60/27*   (2008.01)
*H04H 20/24*   (2008.01)
*H04H 20/22*   (2008.01)

(52) U.S. Cl.
CPC ............. *H04L 69/04* (2013.01); *H04H 60/27* (2013.01); *H04L 65/601* (2013.01); *H04H 20/22* (2013.01); *H04H 20/24* (2013.01)

(58) Field of Classification Search
CPC ....... H04L 69/04; H04L 65/601; H04H 60/27; H04H 20/22; H04H 20/24
See application file for complete search history.

(56) References Cited

U.S. PATENT DOCUMENTS

| | | | | |
|---|---|---|---|---|
| 5,907,801 A | * | 5/1999 | Albert | G06Q 20/04 340/5.4 |
| 6,661,845 B1 | * | 12/2003 | Herath | H04B 1/66 375/240.23 |
| 7,051,126 B1 | * | 5/2006 | Franklin | G06F 13/122 709/247 |
| 2004/0066736 A1 | | 4/2004 | Kroeger | |
| 2004/0151171 A1 | * | 8/2004 | Lee | H04J 14/0209 370/380 |
| 2006/0259168 A1 | * | 11/2006 | Geyersberger | G10L 19/173 700/94 |

(Continued)

FOREIGN PATENT DOCUMENTS

WO    2009034219 A1    3/2009

OTHER PUBLICATIONS

Hoen, C. et al. "RTP Payload Format for Bluetooth's SBC audio codec draft-hoene-avt-rtp-sbc-05.tx", Philips Electronics, 23 pgs., retrieved from the Internet at: https://tools.ietf.org/html/draft-ietf-payload-rtp-sbc-05 (Dec. 15, 2009).

*Primary Examiner* — Kevin T Bates
*Assistant Examiner* — Lesa M Kennedy
(74) *Attorney, Agent, or Firm* — Rajeev Madnawat

(57) ABSTRACT

A method and receiver are provided. The receiver comprises a first delay buffer and redundant data removal block. The first delay buffer is configured to delay a first data stream carrying first content. The first data stream is comprised of a plurality of compressed data blocks. The redundant data removal block configured to for each compressed data block of the first data stream: identify redundant data in the compressed data block; remove the redundant data to provide a reduced compressed data block; and store the reduced compressed data block in the first delay buffer.

14 Claims, 5 Drawing Sheets

(56) References Cited

U.S. PATENT DOCUMENTS

| | | |
|---|---|---|
| 2008/0235389 A1 | 9/2008 | Lindblom |
| 2011/0106546 A1 | 5/2011 | Fejzo |
| 2011/0122893 A1* | 5/2011 | Kang .................... H04L 69/04 |
| | | 370/477 |
| 2012/0243612 A1 | 9/2012 | Wiegand |
| 2013/0266027 A1 | 10/2013 | Takada et al. |
| 2014/0341303 A1* | 11/2014 | Mendhekar ........... H04N 19/12 |
| | | 375/240.26 |
| 2016/0105861 A1* | 4/2016 | Martinez ............ H04W 56/005 |
| | | 370/210 |
| 2018/0212883 A1* | 7/2018 | Wei ...................... H04L 69/161 |

* cited by examiner

MULTIPLE SOURCE RECEIVER

CROSS-REFERENCE TO RELATED APPLICATIONS

This application claims the priority under 35 U.S.C. § 119 of European Patent application no. 16177551.5, filed on Jul. 1, 2016, the contents of which are incorporated by reference herein.

FIELD

This invention relates to the processing and storing of broadcast data in a multiple source receiver and in particular but not exclusively to the storing audio data from multiple sources in a multiple source audio receiver.

BACKGROUND

Some modern broadcast receiver devices are designed to support multiple audio inputs from different broadcast domains. For example end user content (such as a radio show) may be received via audio streams from domains such as frequency modulation broadcasting (FM), digital audio broadcasting (DAB) and/or Internet radio.

The transmit paths of these audio stream may have varying processing delays which result in streams that are misaligned in time. Initial processing at the receiver may misalign the audio streams further.

It may be a requirement for the broadcast receiver to switch from one audio stream or input to another, for example an input may be lost when the receiver moves out of range of the input's source. Due to the misalignment, the transition may not be seamless which degrades user experience. A potential approach to address this is the buffering of the received audio streams. Buffering may increase the amount of memory required to implement a receiver.

Embodiments of the present application may be concerned with the use of memory in such a receiver.

According to a first aspect of the present disclosure, there is provided a method comprising: delaying a first data stream carrying first content; wherein the first data stream is comprised of a plurality of compressed data blocks and delaying the first data stream comprises, for each compressed data block of the first data stream: identifying redundant data in the compressed data block; removing the redundant data to provide a reduced compressed data block; and storing the reduced compressed data block in the first delay buffer.

The first data stream may be one of a plurality of data streams carrying the first content, the method further comprising: receiving the plurality of data streams, each of the plurality of data streams being received from a respective transmission path having a respective delay; and aligning the plurality of data streams by delaying the plurality of data streams until at least a first portion of the first content is received for each data stream; wherein delaying the plurality of data streams comprises storing the data streams in respective delay buffers and includes the step of storing the first data stream in the first delay buffer.

Storing the data streams in respective delay buffers may further comprise, for each compressed data block of at least one further data stream of the plurality data streams: identifying redundant data in the compressed data block; removing the redundant data to provide a reduced compressed data block; and storing the reduced compressed data block in the respective delay buffer. Identifying redundant information may comprise identifying control information that is identical for all the compressed data blocks in a data stream. A compressed data block may be created from an uncompressed data block of a data stream. There may be a fixed relationship between the length of the uncompressed data block and the length of the compressed data block.

There may be a variable relationship between the length of the uncompressed data block and the length of the compressed data block and the redundant data may comprise block length information, the method may further comprise: replacing the block length information with a block length reference referencing the block length information in a look up table. The look up table may be created by a redundant information removal block and provided to a redundant information replacement block.

When a respective delay buffer is selected for output, the method may further comprise: restoring the redundant data for stored reduced compressed data blocks. The method may further comprise: decoding the restored compressed data blocks. The method may further comprise: encoding at least one of the data streams to provide a compressed data stream comprising the compressed data blocks. The at least one of the data streams may be a pulse code modulated stream.

According to a second aspect, there is provided a receiver comprising: a first delay buffer configured to delay a first data stream carrying first content, wherein the first data stream is comprised of a plurality of compressed data blocks; and a redundant data removal block configured to for each compressed data block of the first data stream: identify redundant data in the compressed data block; remove the redundant data to provide a reduced compressed data block; and store the reduced compressed data block in the first delay buffer.

The receiver may comprise: a plurality of receive paths configured to receive a plurality of data streams including the first data stream, wherein each of the plurality of data streams carries the first content and is received from a respective transmission path having a respective delay; a buffer comprising a plurality delay buffers including the first delay buffer and configured to align the plurality of data streams by buffering each of the plurality of data streams in a respective one of the plurality of delay buffers until at least a first portion of the first content is received for each data stream.

The redundant data removal block may be further configured to, for each compressed data block of at least one further data stream of the plurality of data streams: identify redundant data in the compressed data block; remove the redundant data to provide a reduced compressed data block; and store the reduced compressed data block in the respective delay buffer. The redundant data removal block may be further configure to identify the redundant data as control information that is identical for all the compressed data blocks in a data stream. A compressed data block may be created from an uncompressed data block of a data stream. There may be a fixed relationship between the length of the uncompressed data block and the length of the compressed data block for at least one data stream.

There may be a variable relationship between the length of the uncompressed data block and the length of the compressed data block in at least one of the plurality of data streams, the redundant data removal block being further configured to: identify block length information as the redundant data; and replace the block length information with a block length reference referencing the block length information in a look up table.

The receiver may further comprise: a selection mechanism configured to select one of the respective delay buffers as an output: and a redundant data replacement block configured to restore redundant data for the reduced compressed data blocks stored in the one of the respective delay buffers. The receiver may further comprise: a decoder configured to decode the restored compressed data blocks. The receiver may further comprise: an encoder configure to encode the at least one of the data streams to provide a compressed data stream comprising the compressed data blocks.

According to a third aspect, there is provided a receiver comprising: a plurality of receive paths configured to receive a plurality of data streams carrying common content, each of the data streams being received from a respective transmission path having a respective delay; a buffer configured to align the plurality of data streams by buffering each of the plurality of data streams in a respective delay buffer until at least a first portion of the common content is received for each data stream; and a redundant data removal block configured to: identify redundant data for each compressed block of at least one of the plurality data streams; remove the redundant data to provide a reduced compressed block; and store the reduced compressed block in the respective delay buffer.

According to a fourth aspect, there is provided a method comprising: receiving a plurality of data streams carrying common content, each of the plurality of data streams being received from a respective transmission path having a respective delay; and aligning the plurality of data streams by delaying the plurality of data streams until at least a first portion of the common content is received for each data stream; wherein delaying the plurality of data streams comprises storing the data streams in respective delay buffers comprising, for each compressed block of at least one of the plurality data streams: identifying redundant data in the compressed block; removing the redundant data to provide a reduced compressed block; and storing the reduced compressed block in the respective delay buffer.

FIGURES

Embodiments will be described, by way of example only, with reference to the drawings, in which.

It will be appreciated that for features that span more than one drawing like reference numerals indicate the like feature.

DETAILED DESCRIPTION

The following embodiments may be described with reference to packet streams carrying audio data. This has been done for ease of explanation only and it will be appreciated that at least some embodiments may be applicable to other types of broadcast or streaming data, for example video data. It will be appreciated that here the term broadcast is intended to cover packet streams broadcast from one entity to multiple other entities as well as packet stream broadcast from one entity to a specific few or a particular one other entity. For example, the broadcast packet stream may be a unicast stream.

In multi-source transceiver systems, content may be transmitted via a plurality of paths corresponding to different transmission technologies. The content may be commonly generated at a common data source but may be processed and transmitted via different transmit paths. Examples of such transmit technologies may include frequency modulation (FM), digital audio broadcasting (DAB), internet broadcasting and/or others. A multi-source receiving device may be able to receive transmissions of the content along two or more of these paths. However, due to processing delays of the respective paths, the commonly generated content carried on the transmission paths may become misaligned.

The receiving device may rely on the content from a first transmission paths to be rendered and provided to a user. If the first transmission path becomes unavailable, the receiving device may switch to provide the content from the second transmission path instead. For example, a user may be listening to the content received via an FM transmission while driving, when they drive into a tunnel and lose their FM signal. The receiving device may then switch to a second transmission, for example a DAB transmission path, to continue to provide the content to the user. Due to the differences in a processing time on the first and second paths, the content received on the first path and the content received on the second path may be misaligned. In order for the switch between the first and second path to be less noticeable, the content on the respective paths needs to be aligned. The receiving device may do this by delaying the content from the path that is ahead in time until at least a portion of the content has been received from the first and second paths. The receiving device can introduce this delay by buffering the received data from the first and second paths.

Buffering the received data on a plurality of receive paths may increase the amount of memory required to implement a receiver. While data on some receive paths may be provided to the delay buffer in a compressed form, other paths may provide the data as uncompressed. Even if this data is then compressed, memory space is at a premium. Embodiments of the present application aim to address the issue of memory space in such a multi-source receiver.

Figure 1:
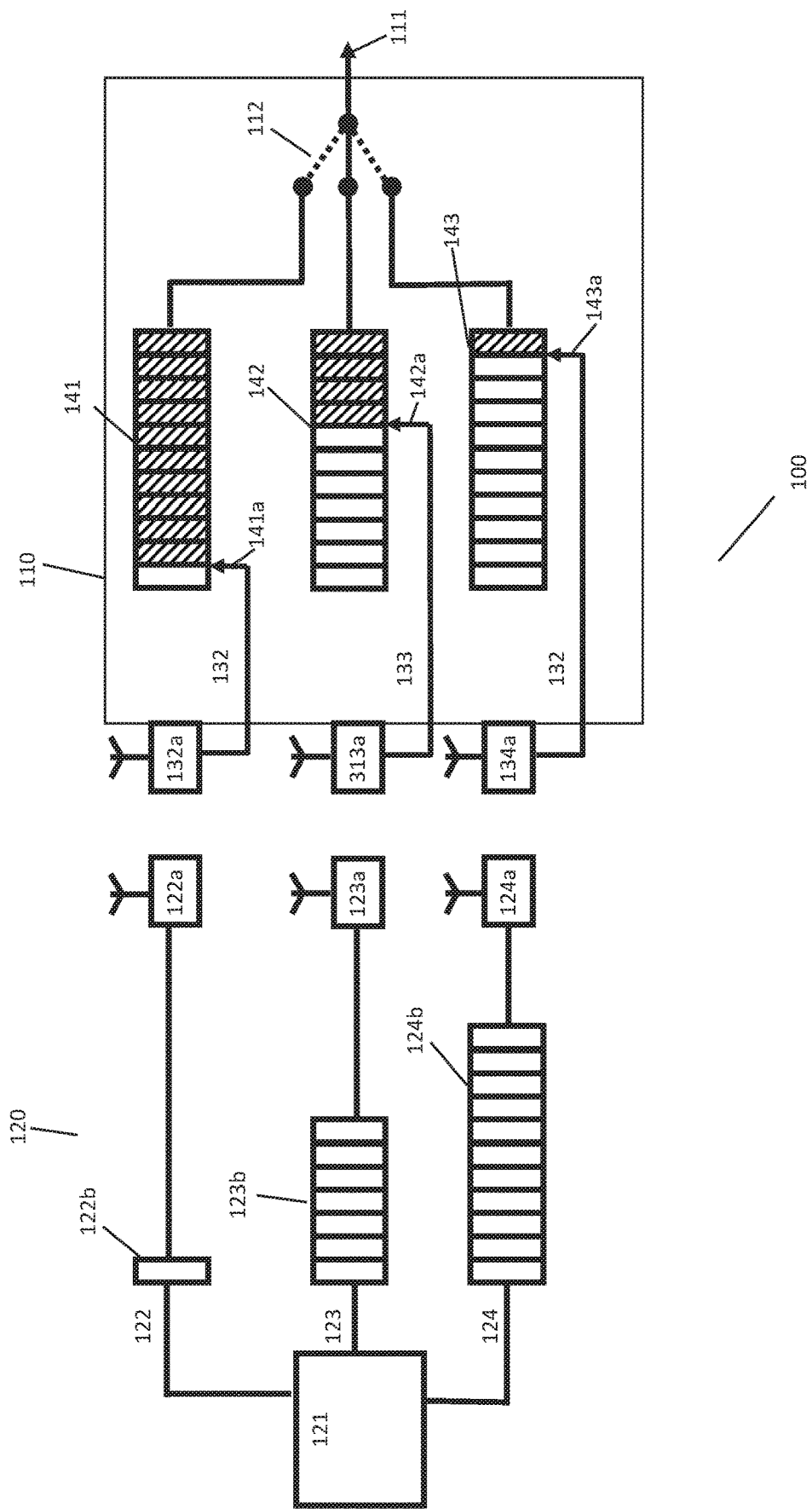
FIG. 1 is an example schematic of a multiple source receiver.

FIG. 1 is an example of a transceiver system that allows the realignment of commonly generated content across a plurality of data streams received from a plurality of transmit paths.

FIG. 1 shows an example of a multi-source broadcast system 100 comprising a receiving device 110 and a transmitting device 120. The transmitting device 120 comprises a common data source 121 and three transmit paths 122, 123 and 124. The common data source 121 may generate content to be transmitted via respective paths 122, 123 and 124. Each transmit path comprises a transmitter 122a, 123a and 124a and a processing delay 122b, 123b and 124b associated with that path.

Each of the transmit paths 122, 123 and 124 may transmit the content according to a different transmission technology. For example the first path 122 may transmit the content based on an analogue technology such as frequency modulation (FM); the second path 123 may transmit the content according to a digital transmit technology such as digital audio broadcasting (DAB); and the third transmit path 124 may transmit the content according to technology such as an internet broadcast.

Each of the three transmit technologies may be associated with a delay that is caused by the different processing that the content undergoes before it can be transmitted by the respective transmitters 122a, 123a and 124a. For example, the processing on the first path 122 may cause the content to experience a first delay 122b, the processing on the second path 123 may cause the content to experience a second delay 123b and the processing on the third path 124 may cause the content to experience a third delay 124b. In the above examples, the paths have been exemplified as being FM, DAB and internet broadcast. Accordingly, the first delay 122b associated with FM is relatively short, for example a time A (depicted as one delay block). The second delay 123b associated with DAB is longer, for example a time B (depicted as seven delay blocks). The third delay 124b, associated with internet broadcast, may experience the longest delays, for example a time period C (depicted with eleven delay blocks).

It will be appreciated that the number of delay blocks is by way of example only and functions to indicate the differing delays experienced by content generated by a common data source 121 along each path. Accordingly, corresponding content on each path reaches the respective transmitter 122a, 123a and 124a at differing times and the content along the three paths is misaligned with respect to time. For example, the content on the second path 123 may be misaligned by a time (B-A) with respect to the content on the first path 122. The content on the third path 124 may be misaligned by a time (C-A) with respect to the content on the first path 122 and by a time (C-B) with respect to the content on the second path 123.

The receiving device 110 comprises three receive paths 132, 133 and 134, each comprising a respective receiver 132a, 133a, 134a and delay buffer 141, 142 and 143. Data streams comprising the content received on each of the paths 132, 133 and 134 is stored in the respective delay buffer 141, 142 and 143 for that path. An output of the delay buffers is coupled to an output 111 via a selection mechanism 112. The output 111 provides data from a selected delay buffer to be rendered and to provide to a user, for example via a speaker. The rendering may include decoding and further processing to output the content.

In this example each of the receiver paths 132, 133 and 134 are configured to receive a data stream comprising the commonly generated content and transmitted according to a different transmission technology. For example, the first receive path 132 may be configured to receive the content transmitted in accordance with FM; the second receive path 133 may be configured to receive the content transmitted in accordance with DAB; and the third receive path 134 may be configured to receive the content transmitted in accordance with internet broadcast.

For example, the first receive path 132 may be configured to receive the content transmitted from the first transmit path 122; the second receive path 133 may be configured to receive the content transmitted from the second transmit path 123; and the third receive path 134 may be configured to receive the user content transmitted from the third transmit path 124.

The respective receivers 132a, 133a and 134a receive respective data streams comprising the content. The content in the data streams may be misaligned due, at least in part, to the delays A, B and C introduced by the relative processing paths 122, 123 and 124. In order to realign the content, the receiving device 110 may delay the respective data streams until at least a portion of the user content has been received on all the packet streams. In general, the delay buffers may delay the availability of data in the buffers to the output until for a period corresponding to the delay between the fastest and slowest transmission path. In this manner, data only becomes available to the output, when corresponding user content has been received on all the paths. At this point, the data in the buffers (comprising the content) may be made available to the output 111 for rendering.

Delaying the respective data streams may comprise storing received data in a respective data buffer. In the example of FIG. 1, the first path 122, 132 has the shortest processing delay and is the first to start receiving data. The received data stream on the first path is written to the first delay buffer 141. A write pointer 141a of the first delay buffer 141 indicates an amount of data that has been written to the first buffer. The delay between the first and second paths is (B-A) and so the first path 132 receives data for a period of (B-A) before the second path starts receiving data. When data is received on the second path 133, it is written into the second delay buffer 142. A write pointer 142a indicated the amount of data that has been written to the second buffer.

The delay between the first and third paths is (C-A) and so the first path 132 receives data for a period of (C-A) before the third path starts receiving data. The delay between the second and third paths is (C-B) and so the second path 133 receives data for a period of (C-B) before the third path 134 starts receiving data. A write pointer 143a indicates the amount of data written to the third buffer. FIG. 1 depicts the state of the delay buffers 141, 142 and 143 when a first unit of a data stream comprising the content is received and stored in the third buffer 143. At this point, the first receive path 132 has been receiving the content for a time period of (C-A) and the second receive path 133 has been receiving the content for a time period of (C-B) and the third receive path 134 has just received its first unit of the content. At this point at least a portion of the content is available in all three of the delay buffers 141, 142 and 143 and so the data in the delay buffers 141, 142 and 143 becomes available for selection to be provided to the output 111.

The read pointers of each buffer 141, 142 and 143 may initially point to the first unit of the content in each buffer and may be synchronised so that they are updated simultaneously regardless of which buffer is coupled to the output 111. In this manner, if the receive paths are switched between (the switching mechanism 112 couples a different buffer to the output 111) the read pointers of all the buffers point to the same position in the content.

It will be appreciated that the delay buffers are of a size to cater to the maximum delay between the fastest and slowest transmit paths. Additionally, the format of the data stored in the delay buffer has an effect on the size requirements of the buffer. Digitally encoded audio data, for example data transmitted along the DAB transmit path may be encoded as MPEG 1 layer 2 data. In some examples this data is best stored as compressed data before decoding for purposes of quality. In another example, data from uncompressed sources (for example audio data in the form of PCM data transmitted along the FM path) may be first encoded before being provided to the delay buffer.

In embedded systems, the size available for the delay buffers may be limited. In these cases, the amount of available storage capacity or memory may have a direct influence on the integrated circuit size. For example, on an integrated circuit using a feature widths of 60 µm, every 100 kilobytes memory increase the chip size by around 0.7 square millimeter. Increasing the chip area increases also the costs of the whole integrated circuit (number of IC per waver, packaging costs).

The amount of memory used for storing the audio data is therefore of interest.

Figure 2:
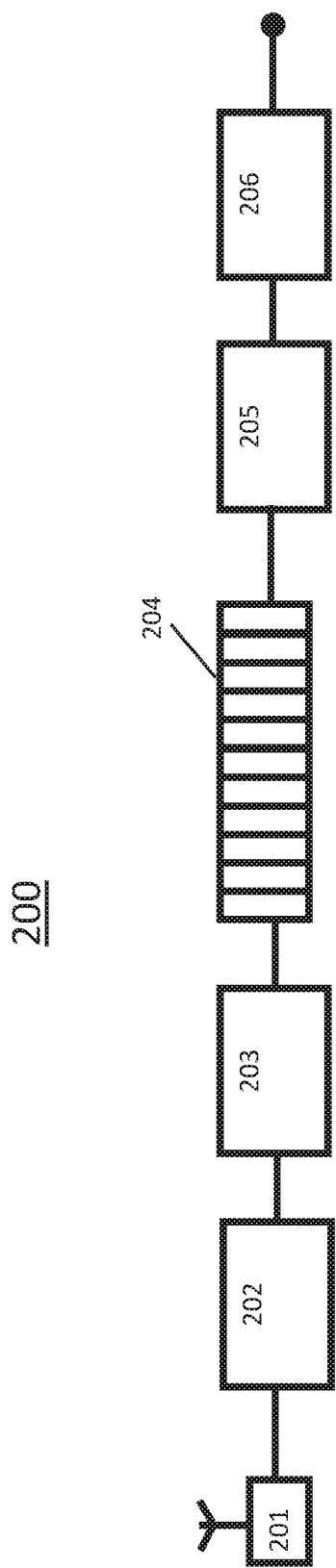
FIG. 2 is a schematic diagram showing an example receive path of a multiple source receiver in accordance with an embodiment.

FIG. 2 shows an example of a receive path 200 for a receiving device in accordance with embodiments. It will be appreciated that the single receive path is by way of example only and the receiving device may comprise a plurality of receive paths for receiving data streams transmitted in accordance with different transmission technologies. The receive path 200 of FIG. 2 may correspond to a receive path for a transmission technology from an uncompressed source, for example from an FM transmission path carrying pulse code modulated (PCM) data.

The receive path 200 comprises a receiver 201, an encoder 202, a redundant information removal block 203, a delay buffer 204, a redundant information replacement block 205, a decoder 206 and an output terminal 207. In operation, the receiver 201 may receive a data stream comprising content from a transmitter, for example one of the transmitters 122a, 123a, 124a of the transmitting device 120. In this example, the data stream may be transmitted accordance with FM. The receiver 201 may carry out pre-processing, for example down-converting and filtering, and provide the data stream to the encoder 202.

The data stream provided to the encoder may be an uncompressed data stream comprising pulse code modulated (PCM) data. The encoder 202 may encode the uncompressed data stream in accordance with an audio compression algorithm or codec. The audio compression algorithm may be block-based, where a certain amount of audio (or data of the data stream) may be processed and a compressed data block is created. In the decoder 206, these compressed blocks may be used to reconstruct the data stream again to provide an uncompressed data stream to the output 207. Compressing the uncompressed data received from the receiver 201 may reduce the space requirements of the delay buffer 204.

Compression algorithms may operate with a compromise between size and quality. A lossy compression method may produce a smaller compressed block at the cost of a quality degradation due to lost information. A lossless compression algorithm may maintain the information but then be limited by the possible block size reduction. Compression algorithms may produce blocks comprising data (in this example data corresponding to the content) and control information that is used to reconstruct the uncompressed data stream.

Embodiments of the present application may further reduce the size of the compressed block by removing redundant control information within the block by a redundant information removal block 203 before storing it in the delay buffer 204. In some examples, the control information may be considered to be redundant if it is the same for all the compressed blocks of the data stream. Removing the control information may reduce the size of the compressed block without having to lose any of the data content in the compressed block.

In a case where compressed data is received at the receiver, or where the received data is decompressed during the receive process, some embodiments may first compress or encode the incoming data before removing redundant information from the encoded blocks. In this case a codec may be selected that is suitable for the removable of redundant information, for example a codec may be selected where at least a portion of the header information for an encoded block is duplicated for each block.

Usually redundant or duplicate information is provided in an encoded block to assist with the decoding and error correction of that block. This is particularly the case where the transmission medium of a path is such that data or information may be lost on route, for example during the wireless transmission from a transmitter to a receiver information may be lost due to channel conditions. In embodiments however, blocks are encoded in order to reduce storage space and because the transmit mediums within the receiver are unlikely to cause data loss, the redundant information may be superfluous. In this case, the redundant information may be removed and a copy of the redundant information that is common to the encoded blocks may be provided directly to a decoder or redundant information replacement mechanism for decoding.

The reduced compressed blocks are stored in the delay buffer 204 which may behave in accordance with the delay buffers described with reference to FIG. 1. When the first receive path 200 is selected to be output, the reduced compressed blocks are read from the delay buffer 204. The reduced compressed blocks are first provided to a redundant information replacement block 205 which replaces the control information to provide restored compressed blocks to a decoder 206. The decoder 206 is configured to decode or decompress the compressed blocks to provide the uncompressed data stream to an output terminal 207. The uncompressed data stream may then be provided to further circuit to output the content to a user.

Figure 3A:
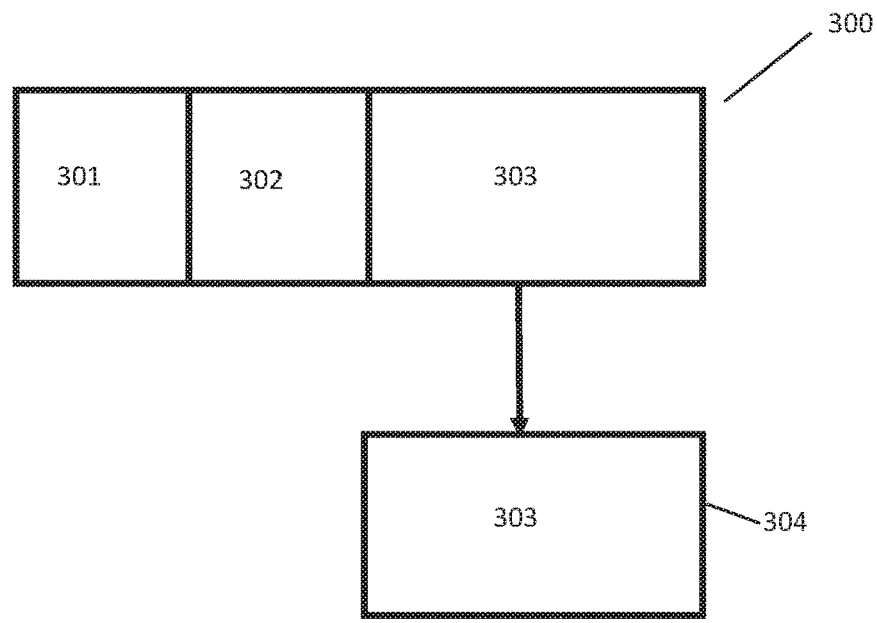
FIGS. 3a and 3b are schematic diagrams showing respective examples of a compression and decompression of a data packet.
Figure 3B:
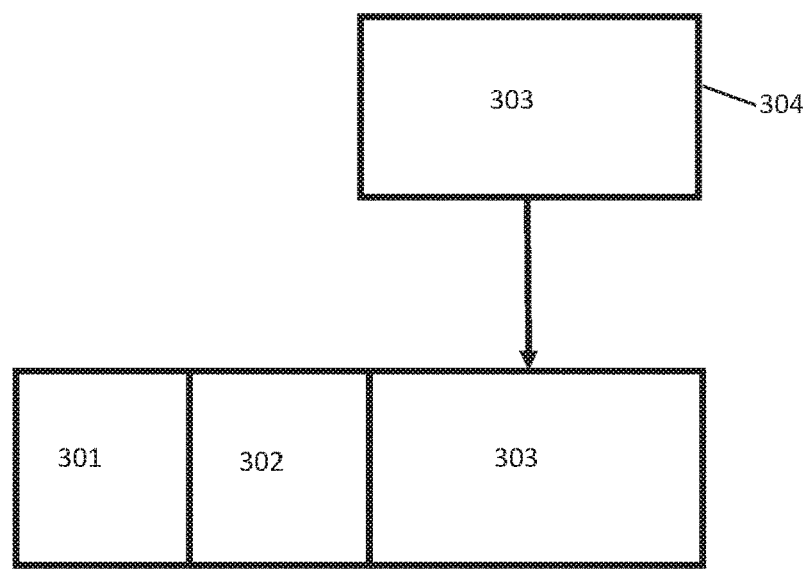

FIG. 3a shows an example of the removal of redundant information within a compressed block in accordance with an example. FIG. 3b shows the replacement of the redundant information in the compressed block in accordance with an example.

A compressed block 300 is created by the encoder 202 which receives data on a received data stream and processes it according to a compression algorithm. The compression algorithm in this case is block-based. In other words a certain amount of incoming data is processed and used to create a compressed data block. Similarly, a compressed data block is provided to the decoder 206 which processes it according to a corresponding decompression algorithm to recover the original data.

The compression and decompression algorithms may form a codec. In embodiments, any suitable codec that works on data blocks having a fixed length and that adds control information to a compressed data block may be used.

FIG. 3a shows an example of a compressed block 300. The compressed block 300 may exemplify a compressed block output from the encoder 202 and comprises synchronization information 301, control information 302 and data 303. The data 303 may correspond to the content generated by the common content generator 121, for example audio data. In this example compressed blocks 300 output from the encoder may have a fixed length and may comprise control information.

The compressed blocks output from the encoder 202 may be provided to a redundant information removal block 203. At the redundant information removal block 203, redundant information contained within the compressed block 300 may be identified and removed. In this example, the synchronization information 301 and control information 302 is removed from the compressed block 303 to provide a reduced compressed block 304. The reduced compressed block 304 in this example comprises the data section 303 of the compressed block 300.

The redundant information removal block 203 may identify the synchronization information 301 as being redundant because the codec in this case operates with a fixed relationship between a length of an uncompressed block of received data and a length of a resultant compressed block. The synchronization information may be identified as being the same for all of the compressed blocks and thus can be removed before storing.

Synchronisation information may be used to find the start position of a frame in an arbitrary data stream. As the start of the first frame is known, the synchronization information may not be needed for the data stream where the codec operates with a fixed relationship between the length of an uncompressed block of received data and a length of a resultant compressed block as the length information is known for all the blocks. In a case where the length of the block is variable, length information must be known for each block or else the position where to reconstruct removed data will become ambiguous.

In a further embodiments, the redundant information removal block 203 may provide a length reference field for each block in order to allow all blocks to have a different (variable) length. In this example the redundant information removal block 203 may replace a length field created by the codec with a length reference field. The length reference field may be a simplified lookup table where the lookup table referenced by the length reference field may be provided to a redundant information replacement block 205 by the redundant information removal block 203. In other examples, it may not be possible to remove the length field and thus the redundant information removal block 203 may remove redundant control information only.

The redundant information removal block 203 may further identify at least a portion of the control information 302 as being redundant. In one example, the redundant information removal block 203 may identify steering information contained within the control information as being redundant because all of the encoded or compressed blocks share the same structure. For example, information about sample rate or bitrate may be removed from the control information, and reconstructed again before decoding. The steering information may be stored only once for reconstruction, and need not be stored with each compressed block.

In examples, for redundant information that is the same for all of the compressed blocks, the redundant information may be stored only once instead of with each block. In this case, the redundant information may for example be stored in the delay buffer with a first compressed block for the data stream. In another example, the redundant information may be provided from the encoder to the decoder. In another example, the redundant information may be stored in an additional memory and buffer to which the decoder and/or redundant information replacement block has access. In this example, the blocks have the same length. However it will be appreciated that in other examples the blocks may have variable length in which case the synchronization information will not be removed but may be replaced by a length reference field that requires less storage space than the synchronization information (in other words, is of a smaller size).

FIG. 3b shows a reconstruction of a reduced compressed block before the restored block is provided to the decoder 206. The data block stored in the delay buffer 204 is a reduced compressed data block comprising data. When the receive path 200 is selected for output, the reduced compressed data blocks 304 may be provided to a redundant information replacement block 205.

The redundant information replacement block 205 may reconstruct the redundant information 301, 302 removed by the redundant information removal block. The redundant information replacement block 205 may do this by, for example, receiving the redundant information from the redundant information removal block 203 or using a characteristic of the codec, for example the fixed relationship between uncompressed and compressed block length. The restored compressed blocks may then be provided to the decoder 206 for decoding.

In some examples, the decoder may require access to compressed data blocks out of order. In this case, the position of a reduced compressed data block may be identified within the delay buffer 204 because the reduced compressed data blocks have a fixed length. In this case, random access to an arbitrary data block is possible. For example, the start position of each block in the delay buffer 204 may be addressed by stepping multiples of one reduced compressed block length through the buffer, starting at the known start address of the audio buffer. The redundant information replacement block 205 may receive the arbitrarily addressed block from the delay buffer 204 and replace the redundant information to provide a compressed block to the decoder 206.

In the examples of FIGS. 2, 3 and 3a, the encoder 202 has been described as being a separate block and having separate functionality to the redundant information removal block 203. The decoder 205 has also been described as being a separate block and having separate functionality to the redundant information replacement block 205. It will however be appreciated that in some embodiments, the encoder and redundant information removal block may be combined. Similarly, the decoder and redundant information replacement blocks may be combined. For example the redundant information removal/replacement may be carried out as part of a compression/decompression algorithm.

A specific example will now be described in relation to the low complexity sub-band codec (SBC). It will however be appreciated that this is by way of example only and other suitable codecs may be used. The SBC codec is used for streaming audio, and provides high quality and ultra-low coding delays and thus may be suitable for a multi-source audio receiver.

Figure 4A:
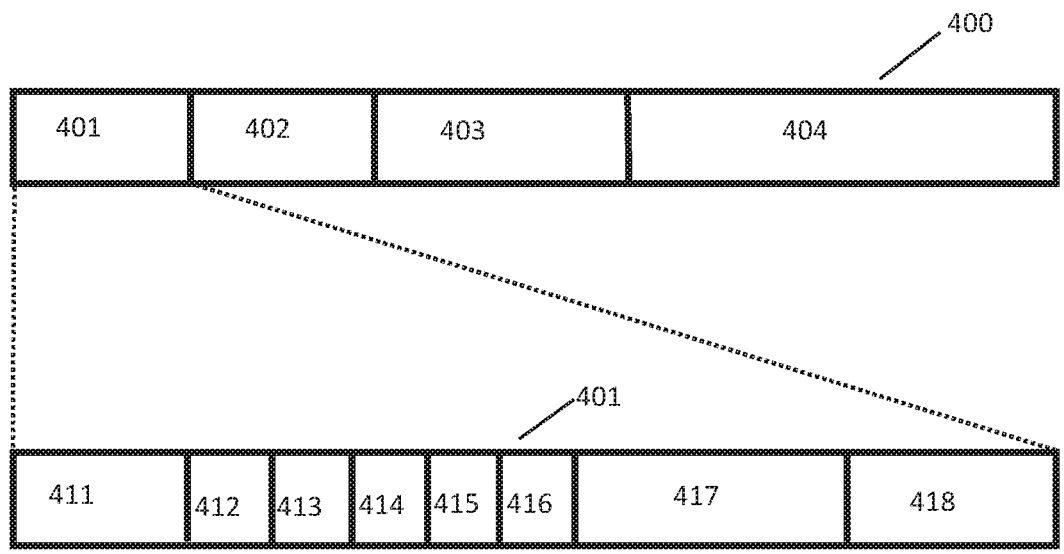
FIGS. 4a and 4b are schematic diagrams showing respective further examples of a compression and decompression of a data packet.

FIG. 4a shows an example of an SBC frame 400. The SBC frame may correspond to the format of the compressed data block provided by the encoder 202. The SBC frame 400 comprises a frame header 401, scale factors 402, audio samples 403 and padding bits 404. The audio samples 403 may comprise samples of audio content that is received by the receive path 200 from a transmitter and corresponds to the commonly generated content. The padding 404 and scale factors 402 may comprise compression data that together with the audio samples 403 forms the data section 303 of compressed block 300.

The frame header 401 comprises further fields shown in FIG. 4a. These fields are synchronization word 411, sampling frequency (SF) 412, blocks (BL) 413, channel_mode (CM) 414, allocation_method (A) 415, sub-bands (S) 416, bitpool 417 and CRC check 418. The SBC frame 400 may be provided to the redundant information removal block 203 which may identify redundant information in the control information or frame header and remove the redundant information.

Figure 4B:
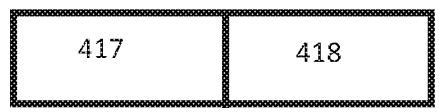

FIG. 4b shows the frame header 401 with redundant information removed. In this case, the redundant information is identified as being the synchronization word 411, sampling frequency (SF) 412, blocks (BL) 413, channel_mode (CM) 414, allocation_method (A) 415 and sub-bands (S) 416 because this information is the same for all of the blocks compressed by the encoder 202. The synchronization word 411, by definition, may always be the same for all frames. The remaining mentioned fields are the same for each frame in the case where a fixed setting for the compression parameter is defined. In other words, where there is a fixed relationship between the length of an uncompressed block and the length of a compressed block.

The fields' bitpool 417 and the CRC check 418 are retained for the reduced compressed block because these field are unique for each block or SBC frame. The redundant information replacement block 205 may determine the redundant information and replace it for each reduced compressed block before provided the block to the decoder.

In this specific example, the reduction of the SBC frame header 401 may reduce the size of the compressed block or SBC frame by two bytes. For example, with an SBC frame size of 500 bytes, this provides a 0.4% saving in required memory space. For an SBC frame size of 100 bytes, this provides a 2% saving in required memory space.

In a further example, the CRC check 418 may be also removed if a CRC recalculation is carried out at the redundant information replacement block 205. It will be appreciated that this may be dependent on a balance between memory space saved and available computational power.

Figure 5:
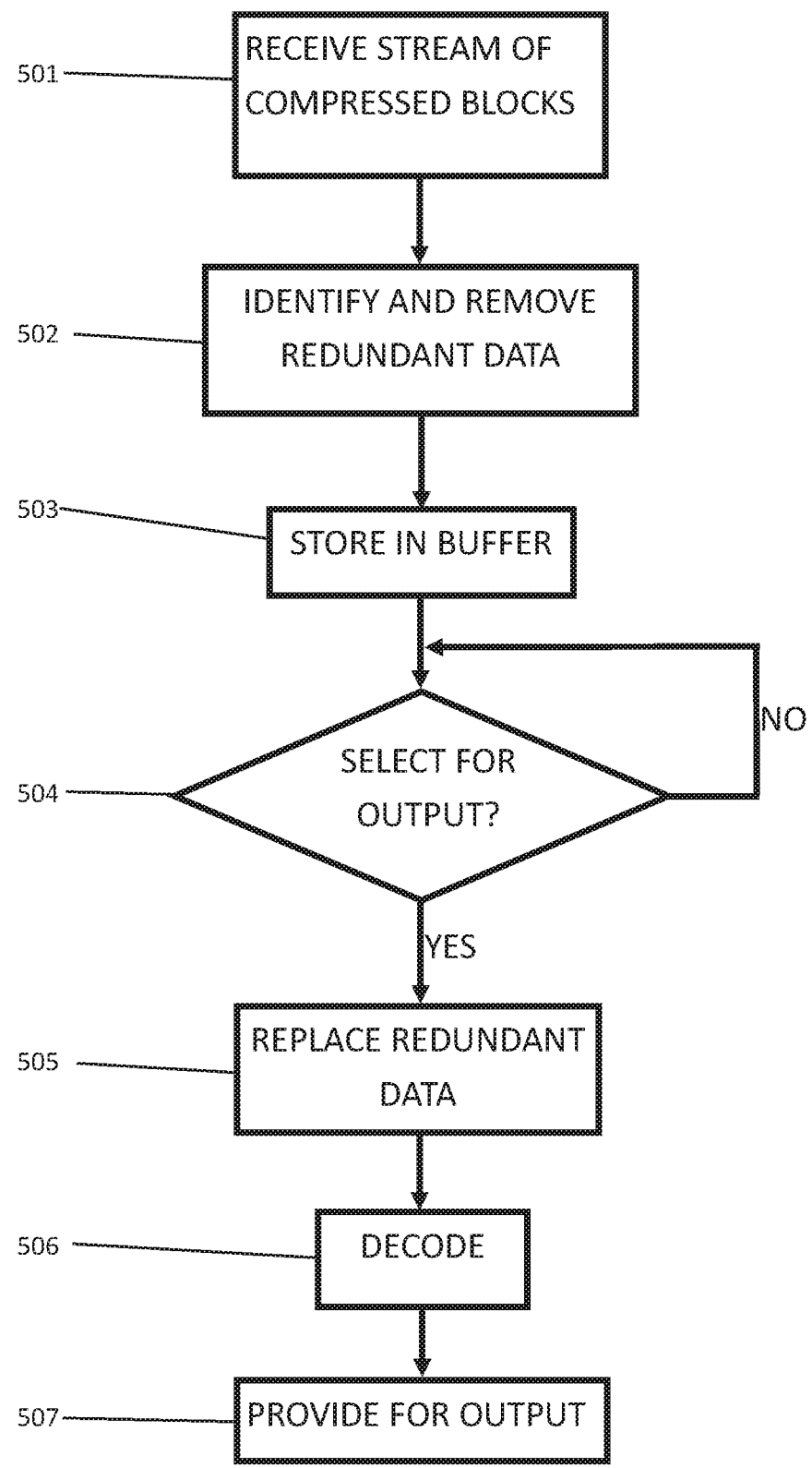
FIG. 5 is a method diagram showing method steps associated with an example.

FIG. 5 is a flow diagram depicting example method steps that may be carried out in accordance with embodiments.

At step 501, a stream of compressed data blocks is received. The data blocks may be compressed by any suitable codec having a fixed ratio between a length of an uncompressed data block and a length of a resultant compressed data block.

At step 502, redundant information is identified and removed from the compressed data blocks to form reduced compressed data blocks. The redundant information may correspond to at least a portion of control information in the compressed data block that is the same for all of the compressed data blocks of the stream. For example, the redundant information may be synchronization information or other fixed control information.

At step 503, the reduced compressed blocks are stored in a delay buffer. At step 504, it is determined whether that stream has been selected for output. For example, the buffer may be a delay buffer configured to delay a received data stream until a portion of user content is received for each of a plurality of data streams carrying that user content. When it is determined that the data stream stored in the buffer at step 503 is selected, the method proceeds to step 505.

At step 505, the redundant information removed at step 502 is replaced. The redundant information may be replaced by a redundant information replacement block and may convert the reduced compressed blocks to compressed blocks. The redundant information may be replaced, by appending fixed control information to the front of a reduced compressed block. The control information may have been received from the redundant information removal block or for example may be stored with a first block of the stream of compressed data blocks.

At step 506, the restored compressed data blocks may be decoded or uncompressed. The uncompressed data blocks may then be provided to an output for optional further processing and output. The output may be for example a speaker for converting audio content in the stream to sound.

In the foregoing we have exemplified encoding or compressing data blocks of a received packet stream and then identifying and removing redundant information from the encoded blocks. This may be useful for example in the case of a packet stream transmitted in accordance with FM transmission. Because FM transmission may experience the least transmission path delay, the corresponding receive path buffer may have to buffer the largest amount of data of all the receive paths in order to realign content received on a plurality of transmission paths. In other words, data is buffered on the FM path while waiting for the DAB and internet broadcast content to 'catch-up'.

If the packet stream is encoded at the receiver before being stored in the buffer, the codec used may be selected to have characteristics suitable for the removal of redundant information. For example, the codec may provide corresponding data in the encoded packet headers. However, it will be appreciated that the encoding of the received data blocks may be by way of example only and some embodiments may be applicable to transmit and corresponding receive paths where encoded blocks of data are received. For example in the case of DAB and/or internet broadcast. In this case, redundant information in the received encoded blocks may still be identified and removed.

In a specific example, because an FM path experiences the least delay, the data blocks of this path may be encoded and have redundant information removed before being buffered. In one case, encoded data blocks received on the other transmit paths (for example DAB or internet broadcast) may be buffered directly or may also be removed of redundant information before being buffered. For example, in the case of DAB audio encoded using MPEG Audio Layer II, each audio frame may start with a header containing a sync word, as well as audio system related information. Some parts of this header may be redundant for each frame, and may be removed. In some cases the codes used on the transmit path may not contain redundant information and thus no information will be removed for this transmit path.

In the foregoing a method and apparatus have been described that can buffer incoming data in a storage efficient manner. In particular, redundant information in compressed data blocks can be identified and removed before the reduced compressed block is buffered. An indication of the redundant information or the redundant information itself can be provided to a redundant information replacement block that can replace the redundant information before the compressed block is decompressed or decoded. The foregoing has exemplified one situation in which this may be applicable, for example as shown in FIG. 1—namely where a plurality of data streams carrying first content are received along different transmission paths which experience different delays. In this example, the data streams may be buffered in order to align the first content carried by the streams. In this example the data streams are received by the same receiving device.

It will however be appreciated that in other examples or embodiments, a data stream may need to be buffered for other reasons. For example, the data stream may carry content that is misaligned with content from another source that is not received at the same receiver. Or alternatively it may be desired to delay the incoming data stream in response to an event, for example a user may pause an audio stream. In this example one data stream may be received and buffered. In this case it may still be beneficial to buffer the data stream in accordance with the receive path 200 of FIG. 2 in order to use storage space efficiently.

The invention claimed is:

1. A method for use with an information communications system, the method comprising:
delaying a first data stream carrying first content, wherein the first data stream includes a plurality of compressed data blocks each having common control information, and delaying the first data stream includes, for each compressed data block of the first data stream:
identifying redundant data including the control information in the compressed data block;
removing the redundant data to provide a reduced compressed data block; and
storing the reduced compressed data block in one of a plurality of delay buffers; and
restoring, in response to one of the plurality of delay buffers being selected for output from a circuit of the communications system, the control information in one of the reduced compressed data blocks in the selected delay buffer, wherein a compressed data block is created from an uncompressed data block of a data stream and wherein there is a variable relationship between a temporal length of the uncompressed data block and a temporal length of the compressed data block and the redundant data comprises block length information, the method further comprising:
replacing the block length information with a block length reference referencing the block length information in a look up table.

2. The method of claim 1, wherein the first data stream is one of a plurality of data streams carrying the first content, the method further comprising:
receiving the plurality of data streams, each of the plurality of data streams being received from a respective transmission path having a respective delay; and
temporally aligning the plurality of data streams by delaying the plurality of data streams until at least a first portion of the first content is received for each data stream;
wherein delaying the plurality of data streams includes storing the data streams in respective delay buffers and wherein the first data stream is stored in the first delay buffer.

3. The method of claim 2, wherein storing the data streams in respective delay buffers further includes, for each compressed data block of at least one further data stream of the plurality of data streams:
identifying redundant data in the compressed data block;
removing the redundant data to provide a reduced compressed data block; and
storing the reduced compressed data block in the respective delay buffer.

4. The method of claim 1, wherein the control information is identical for all of the compressed data blocks in a data stream.

5. The method of claim 1 further comprising:
decoding the stored reduced compressed data blocks.

6. The method of claim 1, further comprising:
converting the reduced compressed data blocks to compressed data blocks.

7. The method of claim 1, wherein restoring for stored reduced compressed data blocks includes appending fixed control information to a front of at least one of the stored reduced compressed data blocks.

8. A receiver comprising:
a plurality of delay buffers including a first delay buffer configured to delay a first data stream carrying first content, wherein the first data stream includes a plurality of compressed data blocks; and
a redundant data removal block configured to, for each compressed data block of the first data stream:
identify redundant data including control information in the compressed data block, the redundant data being repeated in each compressed data block;
remove the redundant data to provide a reduced compressed data block;
and
store the reduced compressed data block in the first delay buffer; and
restoring, in response to the first delay buffer being selected for output from a circuit of the receiver, the control information for stored reduced compressed data blocks, wherein a compressed data block is created from an uncompressed data block of a data stream, there is a variable relationship between a temporal length of the uncompressed data block and a temporal length of the compressed data block in at least one of a plurality of data streams, and the redundant data removal block being further configured to:
identify block length information of the redundant data; and
replace the block length information with a block length reference referencing the block length information in a look up table.

9. The receiver of claim 8 further comprising:
a plurality of receive paths configured to receive a plurality of data streams including the first data stream, wherein each of the plurality of data streams carries the first content and is received from a respective transmission path having a respective delay; and
a buffer including a plurality of delay buffers including the first delay buffer and configured to temporally align the plurality of data streams by buffering each of the plurality of data streams in a respective one of the plurality of delay buffers until at least a first portion of the first content is received for each data stream.

10. The receiver of claim 9, wherein the redundant data removal block is further configured to, for each compressed data block of at least one further data stream of the plurality of data streams:
identify redundant data in the compressed data block;
remove the redundant data to provide a reduced compressed data block; and
store the reduced compressed data block in the respective delay buffer.

11. The receiver of claim 8, wherein the redundant data removal block is further configured to identify the redundant data as control information that is identical for all of the compressed data blocks in a data stream.

12. The receiver of claim 8, wherein a compressed data block is created from an uncompressed data block of a data stream and there is a fixed relationship between a temporal length of the uncompressed data block and a temporal length of the compressed data block for at least one data stream.

13. The receiver of claim 8, the redundant data removal block being further configured to:
convert the reduced compressed data blocks to compressed data blocks.

14. The receiver of claim 8, the redundant data removal block being further configured to:
restore the redundant data for stored reduced compressed data blocks by appending fixed control information to a front of at least one of the stored reduced compressed data blocks.

* * * * *